Feb. 22, 1966  F. H. MUELLER  3,236,543
PLASTIC PIPE COUPLING WITH FRANGIBLE LUGS
Original Filed June 12, 1959  5 Sheets-Sheet 1
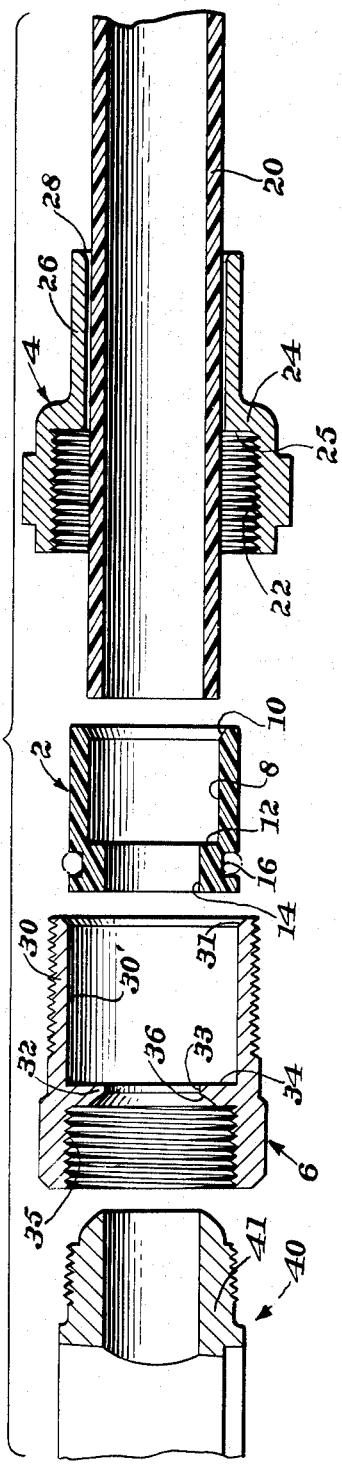
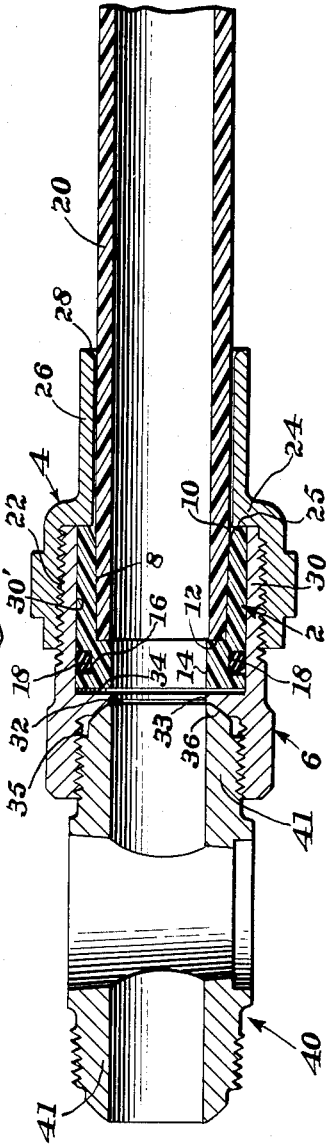
INVENTOR:
*Frank H. Mueller,*
BY
ATTORNEYS.

Feb. 22, 1966   F. H. MUELLER   3,236,543
PLASTIC PIPE COUPLING WITH FRANGIBLE LUGS
Original Filed June 12, 1959   5 Sheets-Sheet 2
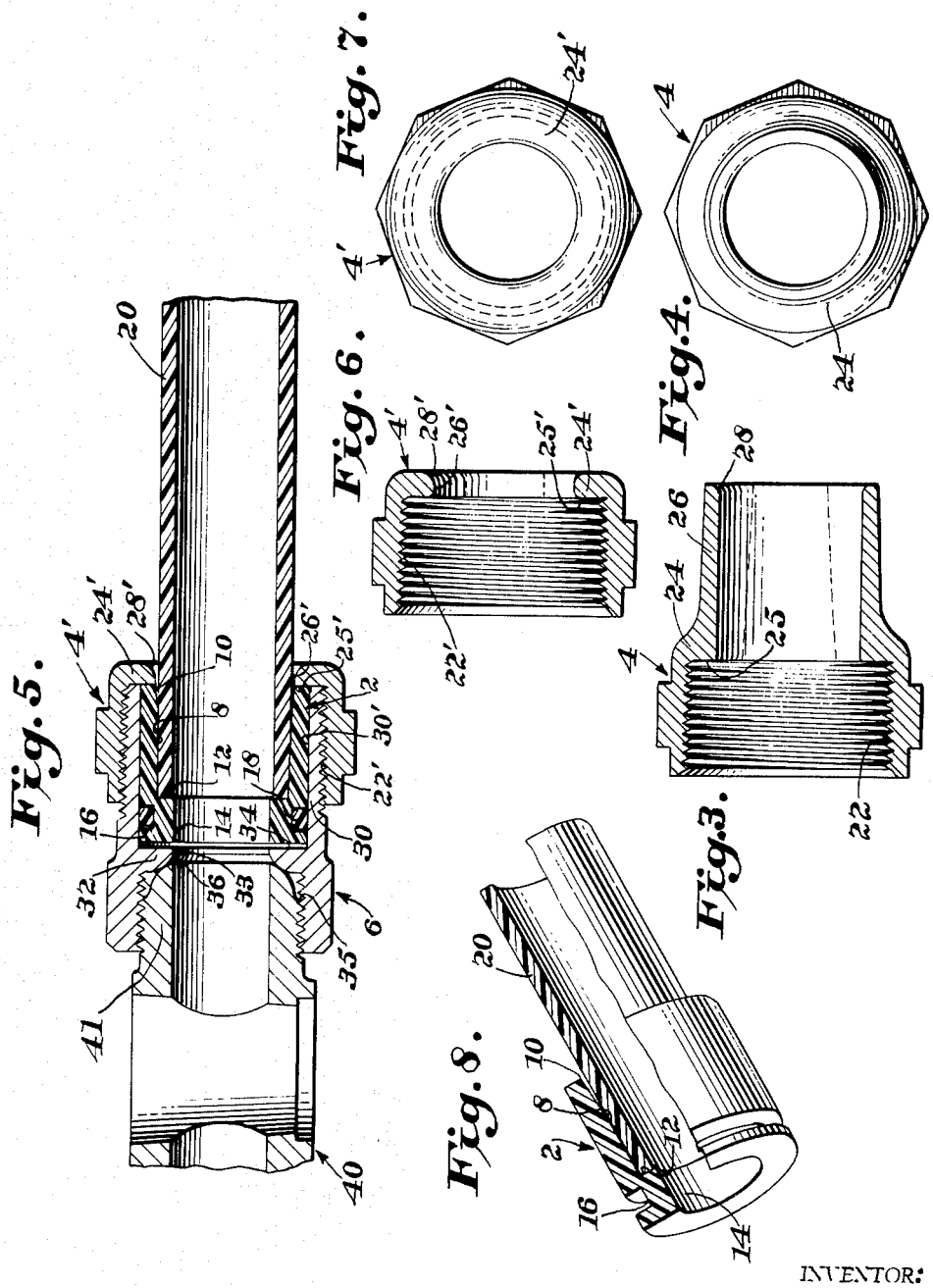
INVENTOR:
Frank H. Mueller,
BY
ATTORNEYS.

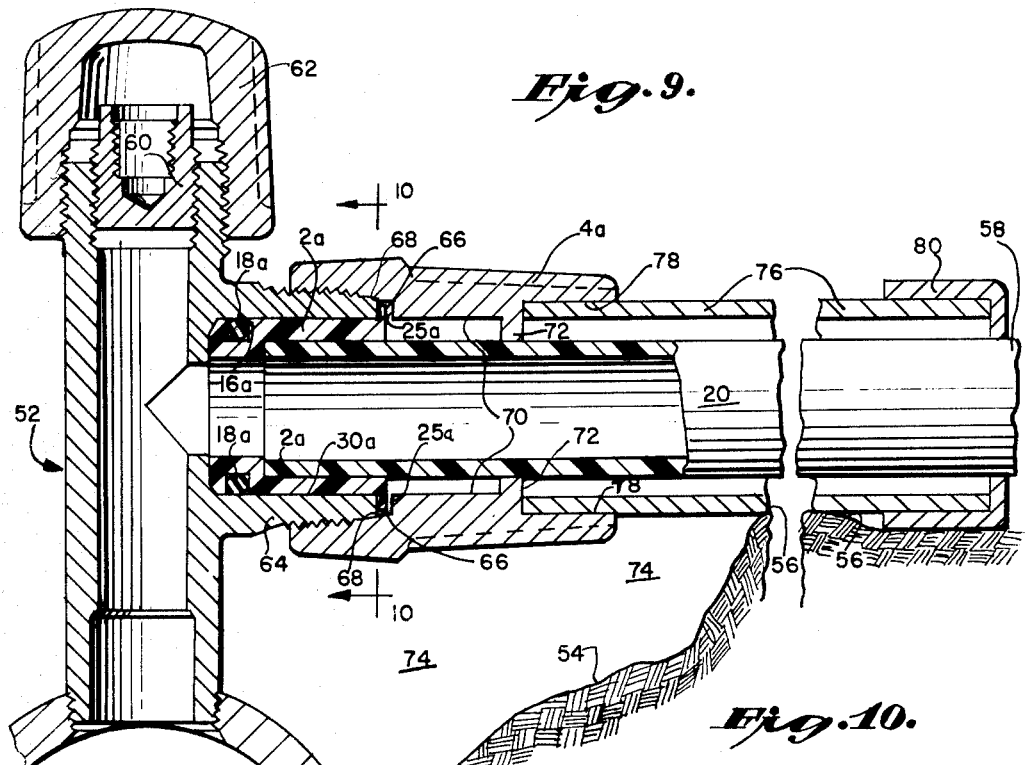
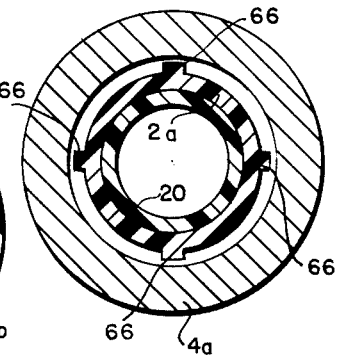
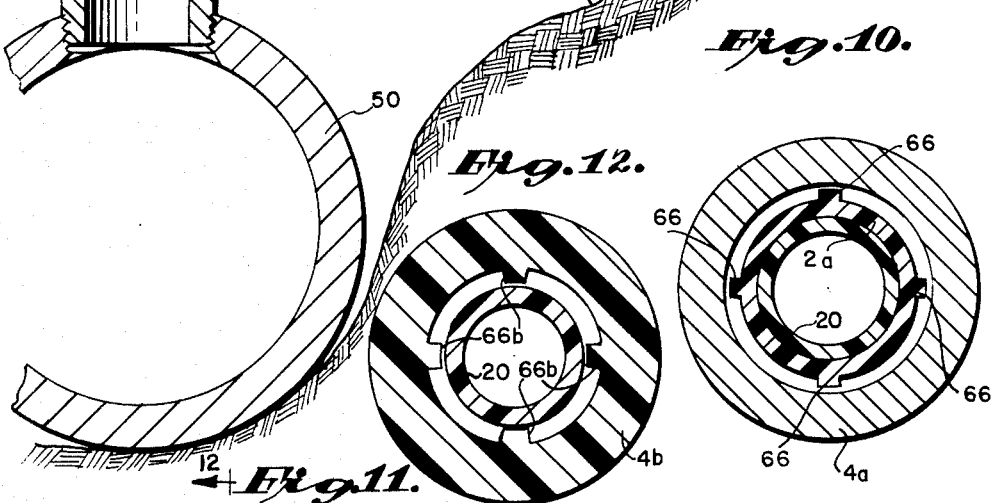
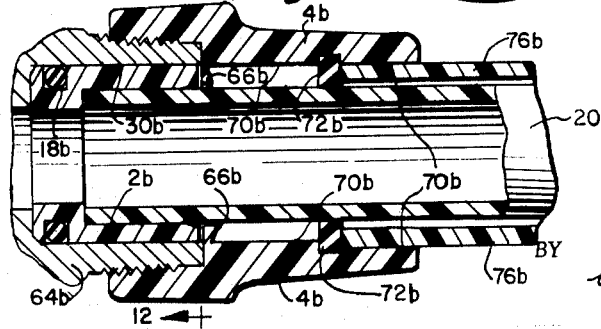
INVENTOR
FRANK H. MUELLER
BY Cushman, Darby & Cushman
ATTORNEYS

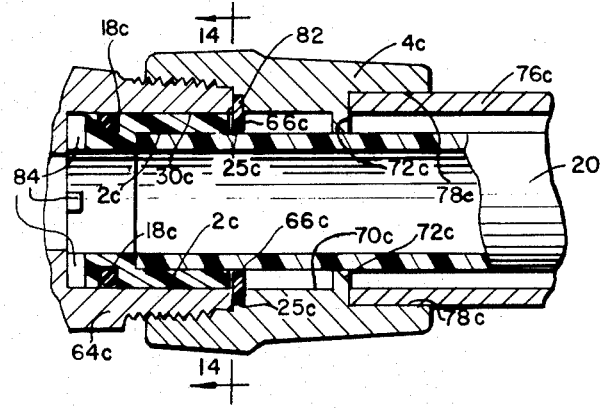
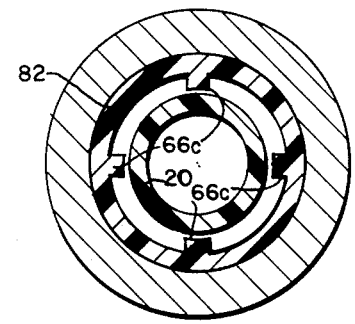
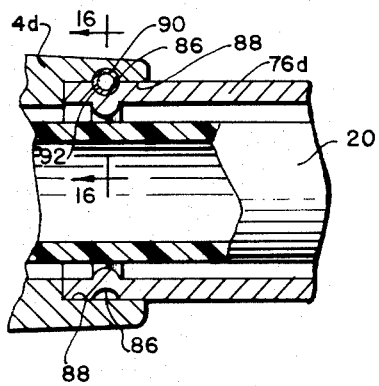
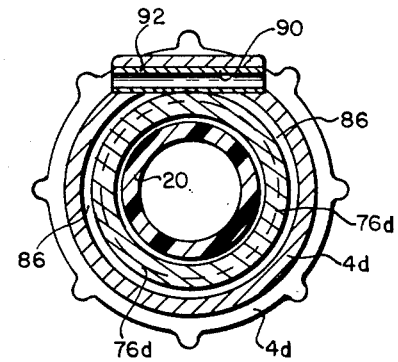
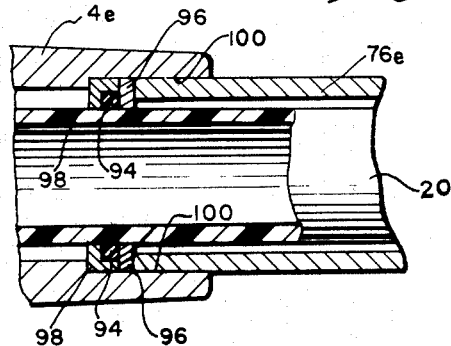

INVENTOR
FRANK H. MUELLER
BY Cushman, Darby & Cushman
ATTORNEYS

United States Patent Office 3,236,543
Patented Feb. 22, 1966

3,236,543
PLASTIC PIPE COUPLING WITH
FRANGIBLE LUGS
Frank H. Mueller, Decatur, Ill., assignor to Mueller Co.,
Decatur, Ill., a corporation of Illinois
Original application June 12, 1959, Ser. No. 819,969.
Divided and this application May 28, 1962, Ser. No.
224,263
4 Claims. (Cl. 285—2)

This is a division of my copending application Serial No. 819,969 now abandoned which was a continuation-in-part of my copending application Serial No. 582,877 now abandoned.

The present invention relates to methods and structures for joining or coupling plastic pipes or tubes to fittings or the like. It also relates to techniques and structures for the underground installation of plastic pipes in fluid distribution systems or the like.

For numerous reasons, as are understood, plastic pipes and tubes are being used to a progressively increasing extent in fluid distribution systems, such as water and gas systems, both in domestic and commercial installations. Serious problems have been encountered in the coupling of plastic pipes of a somewhat rigid character, for example, those formed of polyvinyl chloride, to metal fittings in a satisfactory hermetically sealed and mechanically secure relation. In some cases, it has been proposed to deform or cut into plastic pipes in the regions adjacent to the coupling joint, in the formation of the joint. In such cases, as will be evident, the pipe becomes weakened and subject to rupture due to stress concentrations or the like in these deformed or cut regions.

It has also previously been proposed to secure an external collar on the end of a plastic pipe with this collar being disposed in a tight, locked position between opposed annular flanges or shoulders in a fittting. In such an arrangement, it is essential that the collar be tightly locked in a secure position against any movement relative to the fitting in order that an effective seal will be provided, inasmuch as a sealing ring is arranged for axial compression between one of the flanges of the fitting and an adjacent and opposed end of the collar. This type of joint is undesirable for the reason, among others, that there is no provision for relieving any rotational or torsional stresses imposed on the plastic pipe during use. Thus, if such stresses should reach a sufficiently high magnitude, the pipe itself may be ruptured or the joint between the end of the pipe and the collar may be ruptured.

Furthermore, it has been found that plastic pipes of the type referred to tend to shrink or contract in length with age. It has actually been determined that sometimes contraction or shrinkage, amounting to as much as three inches in one hundred feet occurs in plastic pipe. In the last mentioned joint heretofore proposed, the seal at the end of the plastic collar could be rendered ineffective due to shrinkage of the collar away from the adjacent shoulder of the fitting against which the sealing ring is normally compressed by the collar.

And, understandably, if both ends of the pipe are rigidly secured and held in a stationary, immovable position, as would be required by the types of joints heretofore proposed, as referred to above, and if there is no slack in the pipe, such shrinkage could lead to actual rupture of either the pipe itself or the joint at one or the other of its opposite ends.

This problem due to shrinkage is particularly serious in underground fluid distribution systems, where a leak due to ruptures either in the pipes or in the joints may be difficult to locate and repair or eliminate.

Moreover, in the use of such plastic pipes in underground fluid distribution systems, for example, where the plastic pipe will be connected to an already existing or previously installed underground service main through an underground fitting such as a service T, it has been found that after the plastic pipe is joined to the fitting or service T, and the connection completed so that the plastic pipe is in communication with the service main, the workmen tend to replace the dirt in the service ditch in such manner that undesirable and severe earth loads are exerted in a downward direction on the plastic pipe externally of and adjacent to its connection to the service T. In time, these loads may result in a weakening and rutpure of the hermetically sealed joint connecting the end of the plastic pipe to the service T, thus, creating leaks and presenting the problems incident thereto, as referred to above.

Accordingly, the principal objectives of this invention are as follows: the provision of novel methods and structures for adapting plastic pipe to be conveniently and economically joined to a fitting in a leak-proof and mechanically strong joint; the provision of novel structures for effectively joining plastic pipe to fittings and not requiring the deformation or cutting of the plastic pipe; the provision of novel structural arrangements and combinations permitting plastic pipes to be safely and conveniently installed in an underground fluid distribution system, and particularly adapted to prevent rupture of the plastic pipe or joints, as might be caused by earth loads, shrinkage in the length of the plastic pipe, or the like.

A further objective resides in the provision of a novel leak-proof joint between the end of a plastic pipe and a fitting, not involving the deformation or cutting of the plastic pipe, and wherein the plastic pipe may rotate relative to the fitting, for example, in order to relieve rotational or torsional stresses and without imparing the effectiveness of the fluid seal between the pipe and the fitting. It is a related object that this joint also include novel means providing for limited axial movement of the end of the plastic pipe out of or in the direction away from the fitting, as might result from a tendency of the plastic pipe to contract or shrink in length from age, and without impairing the effectiveness of the seal between the pipe and the fitting. This latter means is of particular importance in connection with the use of plastic pipes in underground fluid distribution systems, where stationary fluid-tight joints would be provided at either end of the plastic pipe, and further wherein it is desired to use as short a length of pipe as possible.

A more specific object is to provide novel arrangements of protective tubular members surrounding plastic pipes particularly in underground fluid distribution systems, these protecting tubular members preferably being joined to the coupling structure for joining the plastic pipe to the fitting.

Further objects and advantages of the invention will be in part obvious and in part pointed out hereinafter.

The novel features of the invention may be best made clear from the following description and accompanying drawings in which:

FIGURE 1 is a longitudinal, cross-sectional view of one embodiment of structure of the present invention for coupling a plastic pipe to a metal fitting;

FIGURE 2 represents an exploded, longitudinal, cross-sectional view showing the parts making up the joint of FIGURE 1;

FIGURE 3 is a longitudinal, cross-sectional view of the coupling member shown in the device of FIGURE 1;

FIGURE 4 is an end view of the coupling member of FIGURE 3;

FIGURE 5 is a view corresponding to FIGURE 1 but showing a modified form of coupling member;

FIGURE 6 is a longitudinal, cross-sectional view of the coupling member shown in FIGURE 5;

FIGURE 7 is an end view of the coupling member shown in FIGURE 6;

FIGURE 8 is a cutaway isometric view of an end portion of the pipe to be coupled, with a tailpiece or collar secured thereon;

FIG. 9 is a vertical, sectional view through an underground fluid distribution system showing an exemplary construction according to another embodiment of the invention, for coupling a plastic pipe in an underground position to a service T;

FIGURE 10 is a sectional view taken generally along line 10—10 of FIGURE 9;

FIGURE 11 is a fragmentary, vertical, sectional view of a modification of the joint and associated structure shown in FIGURE 9;

FIGURE 12 is a sectional view taken generally along line 12—12 of FIGURE 11;

FIGURE 13 is a fragmentary view corresponding generally to FIGURE 11 but showing a further modification of the joint and associated structure;

FIGURE 14 is a sectional view taken generally along line 14—14 of FIGURE 13;

FIGURE 15 is a fragmentary vertical sectional view of a modified construction for connecting a protective tubular member around the plastic pipe;

FIGURE 16 is an end elevational and partly sectioned view taken generally along the line 16—16 of FIGURE 15;

FIGURE 17 is a view corresponding to FIGURE 15 and showing a modification of such structure;

Figure 18:
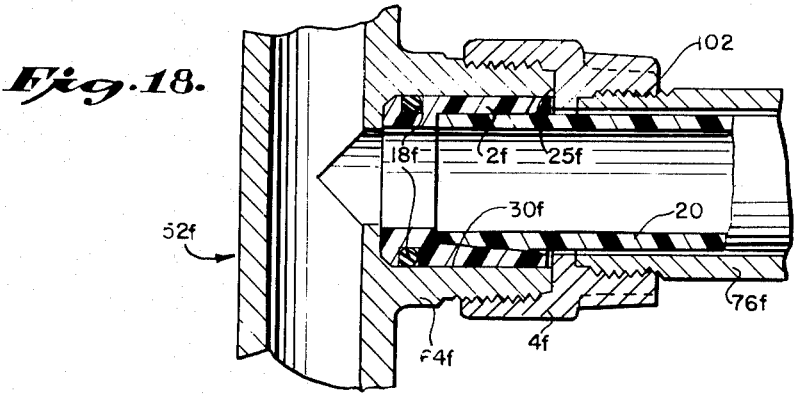
FIGURE 18 is a fragmentary vertical sectional view of structure according to the invention for coupling a plastic pipe to a metal fitting, such structure including a protective tubular member for the plastic pipe.

Referring now to the drawings, a pipe joint embodying the invention is shown in FIGURES 1–4, and comprises a plastic pipe 20, a collar 2 secured to an end of the pipe 20, a tubular fitting or adaptor 6, and a coupling member or nut 4. As indicated heretofore, the plastic pipe 20 may be formed, for example, of a polyvinyl chloride, whereby it will be somewhat stiff or rigid.

The fitting 6 may be made of metal and is shown as having a terminal portion 30 preferably externally threaded for engagement with the coupling nut 4, and also having a recess 30' therein. This recess 30' is provided with an inwardly directed flange 32 at the inner end thereof, a flaring mouth 31 at the open end thereof and is adapted to receive the collar 2 as seen in FIGURE 1.

The end of the fitting 6 opposite the recess 30' may be provided with internal threads 35, as shown. A fluid distributing member, such as a rotary plug valve casing 40 having externally threaded nipples 41 is shown as being secured to the fitting 6. It will be understood that the fitting 6 and member 40 are merely illustrative of the structures to which plastic pipes may be joined in accordance with the invention. It will be further understood that the fitting 6 may itself be the fluid distributing member, i.e., the terminal portion 30 may constitute a valve nipple, or the end of a conduit, or the like.

The flange 32 of the metal fitting defines a central opening 33 and has a flat surface or shoulder 34 on one side thereof and an inclined surface 36 on the other side thereof. The surface 36 is provided for sealingly engaging the nipple 41 of the member 40, as shown, but additional sealing means (not shown) may be provided between these two parts.

The collar or tailpiece 2 preferably is made of a plastic similar to that of the pipe 20 and is counterbored to provide a circular recess 8 having an inner diameter substantially equal to the outer diameter of the pipe 20. The recess 8 has a flaring mouth 10 at the outer end thereof for guiding the pipe therein, and also includes an inwardly directed shoulder 12 at the inner end thereof. Communicating with the recess 8 is an axial bore 14 having a diameter preferably approximately equal to or slightly less than the inner diameter of the pipe 20.

Arranged on the outer surface of the collar 2 intermediate the ends of the axial bore 14 is a peripheral or circumferential groove 16, shown as being rectangular in radial cross section for the reception of an O-ring 18 (FIGURE 1) or other sealing means, this O-ring or sealing means having an inner diameter slightly less than the diameter of the bottom of the groove 16 and an outer diameter greater than the diameter of the recess 30'. The outer diameter of the collar 2 is approximately the same as the inner diameter of the recess 30' in the fitting 6 while the difference between this diameter and the diameter of the bore 14 is substantially the same as the width of the flat surface 34 of the flange 32 of the metal fitting. These diametric relationships will permit the collar to be arranged in the recess 30' of the fitting 6 with the fluid passageway between the pipe 20, collar 2 and opening 33 in the fitting 6 being defined by substantially flush surfaces, as indicated. The length of the collar 2 preferably is slightly less than the axial length or depth of the recess 30' in the fitting 6, as best seen in FIGURE 1, for a purpose to become apparent as the description proceeds.

The coupling nut 4 has an internally threaded recess 22 at one end and inwardly directed flange 24 defining a flat surface or shoulder 25 at the inner end of the recess with a tubular portion of extension 26 extending axially from said flange and terminating in a flaring open end 28. The inner diameter of the tubular extension 26 is slightly larger than the outer diameter of the plastic pipe 20 over which the nut 4 will be assembled. This coupling member may therefore be readily moved axially on the pipe 20, while the flaring end 28 acts as a guide for telescoping the member over the pipe and for keeping this end from cutting into the pipe 20 if the latter is accidentally bent or deformed thereagainst. The radial width of the flange 24 is approximately the same as the combined width of the flared ends of the collar 2 and fitting 6. The threads in recess 22 of the nut 4 are adapted to engage the external threads on the fitting 6 but it will be obvious to those skilled in the art that any suitable means for connecting the coupling member 4 to the fitting 6 may be employed instead of the threaded connection shown.

An exemplary method of coupling the plastic pipe 20 to the metal fitting 6, as contemplated by this invention, comprises sliding the coupling member 4 over an end of the pipe and moving it rearwardly thereon. The end of the plastic pipe adjacent the member 4 is then suitably secured to collar 2 as by providing the pipe end with a coating of a conventional solvent for the plastic, which solvent may be applied thereto by wiping. Next the recess 8 of the collar 2 is similarly coated with the solvent and the collar is then fitted over the end of the pipe until the shoulder 12 abuts said end. The collar is then held in this position until the collar and pipe become solidly fused or welded together in a strong, fluid-tight joint. Any other suitable process for firmly securing the collar 2 to the end of the pipe 20 in a fluid-tight joint may be employed, but it has been found that solvent welding of these parts is easily accomplished, effective and economical. It thus will be seen that the collar 2, in effect, forms an enlargement on the end of the pipe, as best seen in FIGURE 8, which enlargement permits the pipe to be conveniently coupled or joined to the fitting 6 in the manner to be set forth.

After the collar 2 has been thus secured to the end of the pipe 20, the fitting 6 is then mounted on the collar with the latter being received in the recess 30' of said fitting as seen in FIGURE 1. It will be noted that since the diameter of the O-ring 18, in radial section, is slightly larger than the depth of the groove 16 in the collar, the ring 18 is forcefully compressed into tight sealing contact with the bottom and side walls of the groove 16 and also with the opposed wall of the recess 30' when the fitting 6 is assembled on the collar 2. A leak-proof seal is thereby provided between the complementary surfaces of the collar 2 and the recess 30' in the fitting 6.

Once the fitting 6 has been assembled on the collar 2, as described, the coupling nut 4 is then moved toward the fitting and is threaded thereon until the shoulder 25 thereof abuts the flared end of the fitting 6. Thus, it will be apparent that the flange 32 of the fitting 6 and the flange 24 of the coupling member 4 coact, when these parts are connected, to retain the collar 8 in the recess 30' while permitting relative rotation as well as axial movement between the collar 2 and the fitting 6 to relieve the welded joint between the collar 8 and the pipe of any torsional or rotational stresses that might be imposed on the pipe. At the same time, such joint and the O-ring 18 serve to make the connection between the pipe and the fitting leak-proof.

As has already been mentioned, a plug valve casing 40 may be connected, in the manner described, to the fitting 6 after or before the joint has been constructed, which casing may in turn be suitably connected to additional piping or other fluid conveying structure, as will be evident.

In the event any transverse or radial impacts or forces are exerted on the pipe 20, the tubular portion 26 on the coupling nut will act as a supporting or bracing sleeve for that portion of the pipe which it embraces, thereby preventing the pipe from being deformed adjacent the collar 2 and also serving to rigidify the section of the pipe end embraced thereby. As will be appreciated, such radial or transverse forces on the pipe 20 could otherwise result in a rupturing or fracturing of the pipe adjacent the collar 2.

In FIGURES 5, 6 and 7 there is illustrated a modification of the coupling nut shown in FIGURE 1. In FIGURES 5, 6 and 7, like reference characters have been employed to designate parts identical to those already described.

Referring now to FIGURE 5, the pipe joint, there illustrated, comprises the fitting 6, collar 2, plastic pipe 20, and a modified coupling nut 4'. The coupling nut 4' has an internally threaded recess 22' for engagement with the external threads on the terminal portion 30 of the fitting 6. The modified coupling member is formed with an inwardly directed flanges 24' at one end of the recess 22', but such flange is not provided with a tubular portion as is the coupling nut of FIGURES 1–4. The flange 24' defines an opening 26' therein which opening has a flaring mouth portion 28' at the outer end thereof, similar to and for the same purpose as the flaring mouth 28 on the nut 4. The diameter of the opening 26' is substantially the same as the inner diameter of the outer end of the recess 8 in the collar 2 (as best seen in FIGURE 5).

The method of assembling the coupling device of the embodiment shown in FIGURES 5–7 to the rigid plastic pipe 20 may be identical to the method described hereinabove for the pipe joint of FIGURES 1–4. This arrangement will be useful in installations where no radial or transverse forces of sufficient magnitude to impair the joint between the collar 2 and pipe end are anticipated.

It should be obvious that the method and structures just described will permit a plastic pipe to be conveniently and securely coupled to a metal fitting in a mechanically strong, leak-proof joint without the necessity of deforming or cutting into the pipe, and without requiring any special skill or the necessity of employing any particular tools.

It should be noted that the joint of the invention does not require that any compressive loads be placed on the collar 2 by the coupling nut 4. In other words, the seal between ring 18, on the one hand, and the collar 2 and recess 30' on the other hand does not require that the coupling nut 4 be tightened against the collar 2. The important advantage is to prevent the collar from undergoing plastic deformation or creep which could cause leakage if a face seal were used, that is, if a sealing ring or the like were used at either end of the collar 2 to effect the necessary sealing action by an axial compression of such seal. If the make up torque on the nut is obtained by compressing the plastic collar 2, creep would allow this torque to lessen with age. This loosening could cause failure of the joint, as is evident. The joint of the present invention is designed so that the nut 4 is tightened against the metal fitting 6, and make up torque will remain constant, and will not lessen with age.

Referring now to FIGURE 9, there is shown in this figure an exemplary embodiment according to the invention particularly adapted for connecting a plastic pipe in an underground position in communication with an underground service main 50 and through a fitting, such as a service T 52. The structure for coupling the pipe 20 to the fitting 52, as shown in FIGURE 9, is different from the structure shown in FIGURES 1–7, as will become apparent. However, under some circumstances, the joints disclosed in FIGURES 1–7 may also be used for connecting the pipe 20 to an underground fluid distribution system, such as that indicated in FIGURE 9.

In underground fluid distribution systems, as is understood, a fitting, such as the service T 52 may be applied to the service main 50 at desired locations in order to enable the fluid being handled by the main 50 to be supplied by a service line to a particular area or site. This may be done, for example, by excavating down to the underground service main from the ground level. Numeral 54 in FIGURE 9 indicates an exemplary condition of the earth after the excavation has proceeded down to the main 50. The fitting 52 may then be applied to main 50 in any appropriate manner, as will be understood. For example, the main 50 may be drilled and the fitting 52 secured thereto according to the teachings in Patents Nos. 2,736,335, 2,756,486 and 2,761,688, the disclosures of which are hereby incorporated herein.

A service ditch 56 will then be provided, for example, at a level below the ground level, for the reception of the plastic pipe 20 constituting the service line, as indicated. As is understood, the end 58 of the plastic pipe distant from the fitting 52 will be secured to a suitable coupling or fitting at the location where the fluid is to be delivered (not shown). This may be done by means of a joint such as that shown in FIGURES 1 and 2.

The bottom of the fitting 52 is in communication with the main 50, and the upper end of the fitting will be sealed off, as by the plug 60 and cap 62, as indicated.

The plastic pipe 20 is shown as being coupled to the stem 64 of the service T by a collar 2a secured on the adjacent end of the pipe 20, and disposed in a recess 30a in the stem 64. This joint will thus be seen to be somewhat similar to that shown in FIGURES 1–4, and hence, similar reference characters have been used to designate similar parts and surfaces.

The pipe 20 and collar 2a are both made of plastic, such as polyvinyl chloride, and may be secured together in a mechanically strong and fluid-tight joint by any suitable procedure, such as that previously described.

As indicated heretofore, a problem that exists in connection with the use of plastic pipes in fluid distribution systems or the like is that such a pipe tends to shrink or contract with age, such contraction in some cases amounting to 3 inches in 100 feet. If both ends of the plastic pipe are held stationary, the tensile and other forces set up by such contraction or shrinkage may result in rupture of the pipe and/or of the joints provided at each end thereof. These forces may exceed as much as 150–200 pounds pull on the pipe, in some cases.

In accordance with the invention, means are provided permitting the pipe 20 to undergo such contraction, without impairing the joint, or the fluid-tightness thereof at either end of the pipe. In the illustrative embodiment shown in FIGURES 9 and 10, this is accomplished by providing a plurality of angularly spaced and radially extending frangible lugs 66 at the rear or right hand end of the collar 2a, as shown in FIGURE 9. These lugs are disposed between the right hand end of stem 64 and an annular shoulder 25a formed on the coupling nut or member 4a, secured to the stem 64, as shown. It will be noted that the coupling member 4a includes another annular shoulder 68, to the left of shoulder 25a, as viewed in FIGURE 9, for the purpose of abutting against the right hand end of the stem 64 whereby the position of shoulder 25a will be predetermined so as to be disposed a greater distance from the right hand end of stem 64 than the maximum thickness of the lugs 66.

Thus, as the coupling nut 4a is tightened against stem 64, shoulder 25a of the coupling nut will bear against the lugs 66, to push them and the collar 2a into their optimum or desired position for relieving any subsequent forces caused by contraction, as referred to above. Thus, the collar 2a will be disposed and retained in recess 30a, while the frangible lugs 66 are positioned between the adjacent end of stem 64 and shoulder 25a of the coupling nut, in the manner indicated, Additionally, the coupling nut 4a includes a recess 70 approximately of the same internal diameter as the diameter of the recess 30a in the stem 64, with an inwardly directed radial flange 72 being provided at the inner end of this recess, as indicated. The purpose of these structures will be apparent as the description proceeds.

Due to the clearance between the lugs 66 and the shoulder 25a and adjacent end of the stem 64, it will be apparent that the collar 2a and pipe 20 will be free to undergo rotational movement relative to the stem 64 and coupling member 4a, in order to relieve any rotational or torsional stresses that may be imposed on the pipe 20, such as discussed heretofore. In this connection, it should be noted that the outer diameter of the collar 2a will be of such size relative to the inner diameter of the recess 30a so as not to create frictional forces that would prevent rotation of the collar 2a and pipe 20 relative to the stem 64. Also, in this connection, the inner diameter of the flange 72 on the coupling member 4a will be approximately the same diameter as the outer diameter of the pipe 20, but will not prevent rotation of the pipe relative thereto.

With the construction shown in FIGURES 9 and 10, in the event that the pipe 20 contracts or shrinks in length with age, it will pull the collar 2a to the right, as shown in FIGURE 9, unil the frangible lugs 66 strike the shoulder 25a in the coupling member 4a. At such time, further contraction of the pipe will result in an increase of the pressure exerted between this shoulder and the lugs, until this pressure becomes great enough to shear the lugs 66 from the body of the collar 2a. At such time, it will be apparent that the collar 2a will then be free to be pulled farther to the right by the contracting pipe, and into the recess 70 in the coupling member 4a. At the same time, however, it will be noted that the sealing ring 18a will be maintained in a compressed condition between the side walls of the recess 30a and the groove 16a in the collar so as to preserve the fluid-tightness of the joint. Furthermore, the flange 72 of the coupling member 4a preferably is so positioned that it will prevent the collar from being drawn out of the recess 30a to such an extent that the sealing ring 18a is no longer in sealing engagement with the side walls of such recess 30a.

It might be noted that lugs 66 are shown of a progressively decreasing thickness in a radially inward direction to assure shearing thereof at points adjacent the junctures between such lugs and the body portion of the collar.

These lugs may be designed, for example, to rupture at about 150–200 pounds pull. Additionally, the number and spacing of these lugs 66 may be varied, as desired, as should be evident.

Thus, it should be evident that the joint as shown in FIGURE 9 will advantageously allow for contraction of the plastic pipe, without impairing the effectiveness of the fluid seal in the joint at either end thereof.

As has previously been explained, after a plastic pipe has been coupled to a fitting, such as the service T 52, in an underground fluid distribution system, the earth that had been excavated to provide access to the service main 50 for making such connection normally will be filled back into the hole, surrounding the fitting 52 and pipe 20, as is understood. As the earth is packed back into this hole by the workmen, it has been found that the workmen ordinarily do not take care to pack earth underneath the coupling and left hand end of pipe 20, that is, in the space indicated in FIGURE 9 by the numeral 74, so as to provide an adequate support below the plastic pipe 20 adjacent the fitting 52. Thus, as the earth is packed in above the pipe and the fitting, severe earth loads may be exerted in a downward direction on the pipe 20 adjacent to its joint with the fitting 52. With little or no support underneath the pipe 20 in the region 74, these earth loads, in time, may operate to rupture the pipe 20 and/or its connection with the collar 2a, or otherwise impair the joint between the pipe 20 and fitting 52.

In accordance with the present invention, however, means are included to provide additional protection around the plastic pipe 20 adjacent to its joint with the fitting 52, so as to prevent rupture or damage due to the earth loads referred to. This means is shown in FIGURE 9 as including a protective tubular member 76 surrounding and coaxial with the plastic pipe 20. In this embodiment, the tubular member 76 is secured in a recess 78 provided in the right hand end of coupling nut 4a, and this tubular member 76 is shown as extending into the service ditch 56. This member 76 may be of any appropriate length, extending from coupling nut 4a at least to the service ditch 56, and as shown, it may be suitably engaged at its right hand end to a cup-shaped element 80 provided around the pipe 20. The coupling nut 4a and tubular member 76 may be formed by any appropriate material. For example, these members 4a, 76 may both be formed of metal, or they may both be formed of plastic, such as polyvinyl chloride, or if desired, one may be metal and the other plastic. Furthermore, they may be secured together in any suitable fashion. If they are both formed of plastic, they may be secured in the manner described above for securing the pipe 20 to the collar 2a. If they are both formed of metal, the pipe 20 may be engaged in the position shown by a threaded engagement (not shown) in recess 78. And, if the member 76 is formed of plastic, the element 80 may also be formed of plastic and joined thereto in any appropriate manner, as by solvent welding.

Thus, the tubular member 76 will operate to protect the pipe 20 from the severe earth loads referred to.

FIGURES 11 and 12 show modifications of the construction illustrated in FIGURES 9 and 10, hence, similar reference characters have been used to designate similar structure. In FIGURES 11 and 12, the coupling nut 4b is shown an including a plurality of angularly spaced and radially extending lugs 66b. These lugs are shown as being integral with the nut 4b and as being disposed to the rear of the collar 2b on the pipe 20. In this embodiment the coupling nut 4b preferably is constructed of plastic, such as polyvinyl chloride, and the lugs 66b will serve the same purpose as the lugs 66 shown in FIGURES 9 and 10.

A separate sealing element 72b is secured to the coupling nut 4b, as shown in FIGURE 11, and surrounds the pipe 20. This element 72b may be formed of rubber or other suitable material, and may be secured in an annular groove in the recess 70b of the coupling nut 4b in any appropriate manner.

The protective tubular member 76b is shown as being engaged in the coupling nut 4b, abutting the sealing element 72b. Thus the element 72b will operate in much the same manner as the flange 72 in the coupling nut 4a shown in FIGURE 9.

FIGURES 13 and 14 show a still further modification of the structure illustrated in FIGURES 9 and 10. Again, similar reference characters have been used to designate similar structure. In FIGURE 13, the frangible lugs 66c are shown as being formed on a separate ring-like member 82 fitted and secured between flange 25c on the coupling nut 4c and the opposite facing end of the stem 64c. The ring-like member 82 preferably is formed of a plastic, such as a polyvinyl chloride.

Angularly spaced radially extending kerfs or notches 84 are shown as being provided at the left hand end of the collar 2c in FIGURE 13. These notches 84 may be engaged by an appropriate tool when connecting the collar 2c to the pipe end 20, for example, in the manner disclosed in my copending application Serial No. 572,863 now Patent No. 2,933,428.

FIGURES 15 and 16 illustrate a modification of the structure for engaging the protective tubular member to the coupling nut. As shown, the protective tubular member 76d may be provided with a circumferential external groove 86 therein, formed in any suitable manner, as indicated. The coupling nut 4d includes a recess 88 for receiving this end of the tubular member, and, as seen in FIGURE 16, a transverse bore 90 is provided in the coupling nut adjacent recess 88 whereby a locking pin 92 may be detachably inserted into this bore, so as to lockingly engage in the groove 86 on the tubular member.

In FIGURE 17, there is shown a further modification of structure that may be used to sealingly engage the plastic pipe 20 within the coupling nut 4e. This structure includes a sealing ring 94 disposed in a recess formed by annular elements 96, 98. These latter elements are shown as being secured in a recess 100 in the coupling nut 4e, with the protective tubular member 76e abutting element 96, as shown. As will be evident, the elements 96, 98 are of annular or ring-like construction, surrounding the pipe 20, and they may be secured in the position shown in any appropriate fashion. If the coupling nut 4e is made of plastic, these elements 96, 98 may also be made of plastic and solvent welded in the positions shown. The O-ring seal 94 will be compressed so as to sealingly engage against the pipe 20 and the surfaces of the recess defined between the elements 96, 98, as should be evident.

In FIGURE 18, there is illustrated another exemplary embodiment for joining a plastic pipe to a fitting, such as a service T, and for example, in an underground fluid distribution system. In this embodiment, structure similar to that shown in FIGURES 9 and 10 will be designated by similar reference characters.

The structure shown in FIGURE 18 includes a plastic pipe 20 secured at one end thereof to a collar 2f, the latter fitting in a recess 30f in the stem 64f of a service T 52f, as described heretofore. The coupling nut 4f includes an internally threaded recess 102 into which the protective member 76f is screwed, as shown. The coupling nut 4f and tubular member 76f may both be formed of metal or plastic, or one may be formed of metal and the other plastic, as previously described. The coupling nut 4f is shown as including a flange defining a radial shoulder 25f disposed to the right hand end of the rear of the collar 2f, as shown, for the purposes described above in connection with the joint of FIGURE 1.

The tubular member 76f shown in FIGURE 18 may be connected to the coupling nut 4f by any of the structure or methods described heretofore for this purpose. For example, it may be bonded to coupling nut 4f by a suitable bonding agent, such as an epoxy resin, so as to eliminate the use of threads, if desired.

As will be evident, the tubular member 76f will extend at least between the service T 52f and the service ditch, as referred to above in the description of the embodiment shown in FIGURE 9.

The structure of FIGURE 18 may be modified to include frangible lugs or other means allowing for the contraction or shrinkage in length of the plastic pipe 20, for example, as suggested by the construction shown in FIGURE 9.

Figure 19:
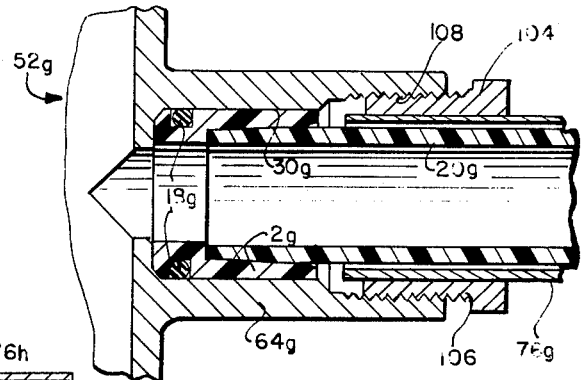
FIGURES 19 and 20 are views corresponding to FIGURE 18 and showing additional modifications.

In FIGURE 19, the protective tubular member 76g is shown as being engaged by means of a split nut 104 directly to the fitting 64g, which may be the stem portion of a service T, as previously described. In this figure, the nut 104 is split longitudinally or axially at 106, and is screwed into an internally threaded recess 108 provided at the right hand end of the stem 64g, as shown. Either the nut 104 or recess 108 or both will be provided with a taper so that as the nut is screwed into this recess, it will tightly engage and retain the tubular member 76g in position surrounding the plastic pipe 20, as will be understood. Pipe 20 is shown as being secured to the fitting 64g by means of the collar 2g and sealing ring 18g in the manner previously described. The left hand end of the tubular member 76g will provide a stop for arresting the movement of the collar 2g to the right or out of the recess 30g in the fitting.

Figure 20:
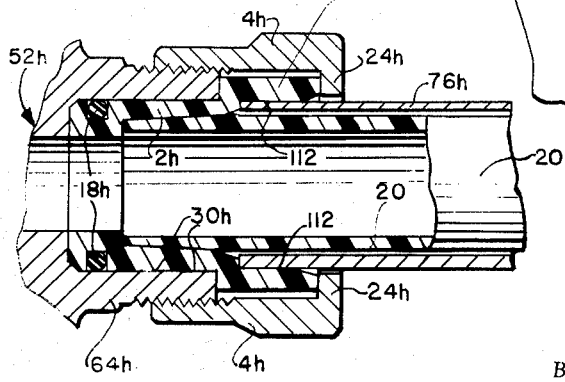

FIGURE 20 shows a further modification wherein the collar 2h includes an axially depending, annular skirt portion 110 integral therewith, and spaced outwardly of the plastic pipe 20. The tubular member 76h is shown as being secured in the recess 112 provided by skirt portion 110. Member 76h may be formed of the same plastic as the collar 2h and pipe 20, and it may be suitably secured, as by solvent welding, in the recess 112 of the skirt portion.

The coupling nut 4h is shown as including an inwardly extending flange 24h adapted to engage against the rear of the skirt portion 110, as shown, when screwed onto the fitting 64h. This fitting may be the stem portion of an underground service T such as that disclosed in FIGURE 9.

It will be appreciated that the service main 50 and service fitting 52, although indicated in the drawings as being made of metal, may be made of a tough, durable plastic, such as a polyvinyl chloride, if desired.

It thus will be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, this invention includes all modifications encompassed within the spirit and scope of the following claims.

What is claimed is:

1. A pipe joint comprising: a pipe made of plastic characterized by a tendency to shrink with age; a hollow fitting having a recess therein terminating at its inner end in an outwardly-faced shoulder; means defining a circumferential enlargement welded to one end of said pipe and disposed for axial and rotational movement in said recess; means providing a circumferential fluid seal between said enlargement and said recess while allowing said movement; a coupling member detachably connected to said fitting; and yieldable means operatively associated with said member and said enlargement adjacent the rear end of the latter for normally retaining said one end of said pipe substantially in engagement with said shoulder by permitting contraction of said pipe to a predetermined degree in a direction away from said shoulder without impairing said seal.

2. The structure defined in claim 1 wherein said yieldable means includes a plurality of rupturable lugs extending radially outwardly from said enlargement; and further wherein said coupling member includes an inwardly facing shoulder engaged by said lugs.

3. The structure defined in claim 1 wherein said coupling member is made of plastic and said yieldable means includes a plurality of lugs integral with said coupling member and extending radially inwardly thereof and overlapping the outer end of said enlargement.

4. A pipe joint comprising: a pipe made of synthetic resin plastic; a fitting having a recess therein; a collar secured to one end of said pipe, said collar being disposed for axial movement within said recess; sealing means carried by said collar adjacent the inner terminal end thereof and engaging the walls of said recess, means to restrain axial movement of said sealing means with respect to said collar thereby providing a circumferential fluid seal between said collar and said recess while allowing said collar to move axially within said recess; a coupling member connected to said fitting; yieldable means carried by one of said collar or said coupling member adjacent the rear end of said collar and operatively disposed to engage the other of said collar or said coupling member to effect releasable interengagement of said collar and said coupling member to thereby normally retain said collar substantially completely within said recess; and stop means carried by said coupling member and disposed in the path of axial movement of said collar, said stop means being spaced axially from the rear end of said collar a distance less than the axial spacing of said sealing means from the outer end of said recess, when said collar is substantially completely within said recess, so that axial movement of said pipe outward of said recess is first resisted by said yieldable means and after yielding thereof is limited by abutment of the rear end of said collar with said stop means so that the circumferential fluid seal between said collar and said recess will be maintained.

References Cited by the Examiner
UNITED STATES PATENTS

| | | | |
|---|---|---|---|
| 1,013,258 | 1/1912 | Wyton | 285—397 X |
| 1,530,679 | 3/1925 | Lambert | 285—2 |
| 1,871,883 | 8/1932 | Geyer | 285—45 X |
| 2,658,527 | 11/1953 | Kaiser | 138—148 X |
| 2,736,335 | 2/1956 | Webber | 77—37 X |
| 2,933,428 | 4/1960 | Mueller | 285—423 X |

References Cited by the Applicant
UNITED STATES PATENTS

| | | |
|---|---|---|
| 770,040 | 12/1904 | Malone. |
| 2,268,263 | 12/1941 | Newell et al. |
| 2,546,348 | 3/1951 | Schuman. |
| 2,641,491 | 6/1953 | Mueller et al. |
| 2,722,238 | 11/1955 | Stuvel. |
| 2,765,182 | 10/1956 | Williamson. |

CARL W. TOMLIN, *Primary Examiner.*